United States Patent [19]

Tanaka

[11] 4,302,221
[45] Nov. 24, 1981

[54] PROCESS FOR REGENERATION OF CARBONACEOUS ADSORBENT FOR USE IN DESULFURIZATION OF EXHAUST GAS

[75] Inventor: Hiromi Tanaka, Abiko, Japan

[73] Assignee: Sumitomo Heavy Industries, Ltd., Tokyo, Japan

[21] Appl. No.: 126,765

[22] Filed: Mar. 3, 1980

[30] Foreign Application Priority Data

Mar. 9, 1979 [JP] Japan .................................. 54-27411

[51] Int. Cl.³ ............................................ B01D 53/08
[52] U.S. Cl. .......................................... 55/60; 55/62; 55/73; 55/79; 252/441 S
[58] Field of Search .................... 55/34, 60, 62, 73, 79; 252/411 R, 411 S

[56] References Cited

U.S. PATENT DOCUMENTS

| | | | |
|---|---|---|---|
| 2,493,911 | 1/1950 | Brandt | 55/79 |
| 2,946,402 | 7/1960 | Becker-Boost et al. | 55/79 X |
| 3,177,631 | 4/1965 | Tamura | 55/79 X |
| 3,405,508 | 10/1968 | Peters et al. | 55/73 |
| 3,634,028 | 1/1972 | Hohne | 55/73 X |
| 4,094,815 | 6/1978 | Cedro et al. | 252/411 R X |
| 4,199,872 | 4/1980 | Bischoff | 252/411 S X |
| 4,207,082 | 6/1980 | Okamoto et al. | 55/60 |

Primary Examiner—Robert H. Spitzer
Attorney, Agent, or Firm—Blanchard, Flynn, Thiel, Boutell & Tanis

[57] ABSTRACT

The present invention is to provide a process for the regeneration of carbonaceous adsorbent for use in desulfurization which comprises flowing spent carbonaceous adsorbent, which has been used in the dry desulfurization of a sulfur oxide-containing exhaust gas, together with an inert gas downwardly into a heating zone; heating said spent adsorbent to regeneration temperatures by bringing a heating gas into contact with the spent adsorbent and inert gas indirectly in said heating zone so that the spent adsorbent is regenerated as well as matters desorbed from the adsorbent are purged therefrom by the action of said inert gas; and separating the thus regenerated adsorbent from the inert gas accompanying the desorbed matters in a separating zone located under the heating zone.

4 Claims, 2 Drawing Figures

FIG. 1
FIG. 2
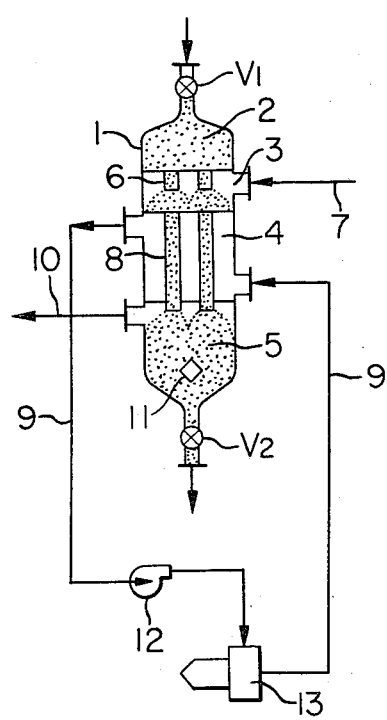
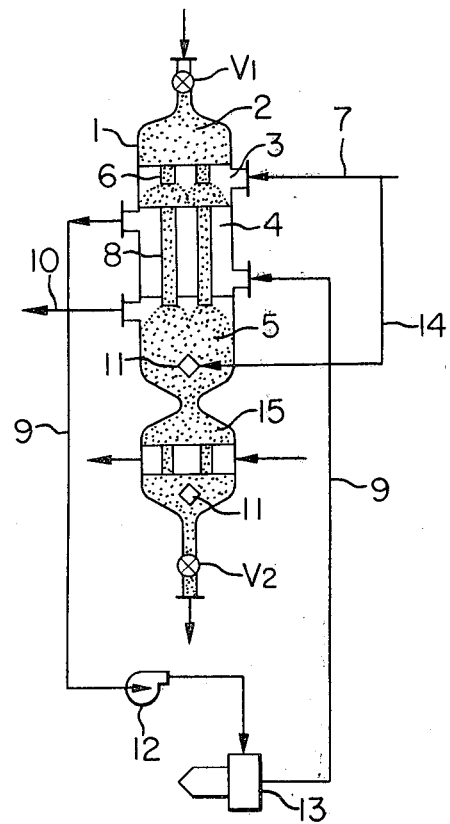

PROCESS FOR REGENERATION OF CARBONACEOUS ADSORBENT FOR USE IN DESULFURIZATION OF EXHAUST GAS

BACKGROUND OF THE INVENTION

The present invention relates to an improved process for the regeneration of spent carbonaceous adsorbent which has been used for the dry desulfurization of an exhaust gas containing sulfur oxides, in particular sulfur dioxide, which comprises heating said spent adsorbent in an inert gas atmosphere.

As one attempt of dry-desulfurizing exhaust gases coming from stationary generating sources, there has been put to practical use a process of the type which comprises employing carbonaceous adsorbent and bringing it into contact with exhaust gases in a moving bed. According to this process, ammonia is sometimes introduced into the moving bed of carbonaceous adsorbent for the purpose of improving the desulfurizing efficiency of the active carbon and/or achieving the denitrification simultaneously. In any case, the dry desulfurization processes of the type mentioned above generally involves the steps of regenerating the carbonaceous adsorbent at a proper time to thereby restore its adsorbing efficiency, said carbonaceous adsorbent having been deactivated gradually by contact with exhaust gases, and then using it again for the purpose of contact with exhaust gases.

The conventional processes for the regeneration of spent carbonaceous adsorbent comprising heating the spent adsorbent in an inert gas atmosphere and regenerating may be roughly classified into two processes, that is, one wherein inert gas is itself employed as a heating medium and the other wherein sand is employed as a heating medium. The former is directed toward a process which comprises using a cross flow type moving bed regenerator and bringing a heated inert gas into direct contact with a spent adsorbent bed. The latter is directed toward a process which comprises mixing separately heated sand particles with spend adsorbent in an inert gas atmosphere. In the latter process high temperatures ranging from 500° C. to 650° C. are needed for regenerating the spent adsorbent. In contrast, the former process is advantageous in that comparatively low temperatures ranging from 300° C. to 400° C. are sufficient for regenerating the spent adsorbent because the inert gas, utilized as a heating medium, also acts as a purging gas.

Despite this, the former process is defective in that the use of a cross flow type moving bed naturally results in a temperature gradient therein and when the temperature in its low temperature zone (the upper zone of the moving bed) drops below the dew point of a corrosive desorbed gas, there is not only the possibility of the regenerator being subject to corrosion but also the disadvantage that the condensate of the desorbed gas will cause the active carbon particles to adhere to each other to form lumps. Additionally, when using the cross flow type moving bed there is needed special attention to protect the heaters and conduits used therein from the attack of the corrosive gas desorbed from the active carbon which accompanies the inert gas, i.e., the heating medium.

Further, a process for regenerating spent carbonaceous adsorbent by means of a counter current moving bed is a different embodiment of the general process of utilizing inert gas as a heating medium. This process comprises supplying a heated inert gas upwardly in relation to a bed of downwardly flowing spent adsorbent for the purpose of bringing both into contact. This process is advantageous in that it can exhibit a superior thermal efficiency. But it is defective in that the apparatus therefor is necessarily constructed to have a considerably large sectional area because the speed of the gas current must be decreased in order to prevent scattering of the fine adsorbent particles. Still further, in this process there is the possibility that the problem of dew condensation can occur due to the fact that since the outlet port of the heating gas in the moving bed is made the inlet port of spent adsorbent, the gas temperature is lowered too much. For the above reasons, the above mentioned process for regenerating spent carbonaceous adsorbent of the counter current moving bed type is not generally put to practical use.

SUMMARY OF THE INVENTION

It is an object of the present invention to eliminate the aforesaid problems inherent in the conventional regeneration processes. In more detail, the present invention is directed toward regeneration of spent carbonaceous adsorbent which comprises heating the spent adsorbent indirectly by using a normal heating gas as a heating medium and using an inert gas exclusively for purging purposes. In other words, the process for the regeneration of spent carbonaceous adsorbent according to the present invention can be defined as follows. A process for the regeneration of spent carbonaceous adsorbent, which has been used for the dry desulfurization, by heating the same in an inert gas atmosphere, characterized by mixing the inert gas with the spent adsorbent; heating the resulting mixture by indirect heat exchange between the mixture flowing downwardly into a heating zone and a heating gas passing upwardly through the heating zone; purging matters desorbed from the spent adsorbent by means of the inert gas contained in this mixture; and separating the desorbed matters together with the inert gas from the active carbon in a separating zone located under the heating zone.

The term "inert gas" used herein means a substantially oxygen free gas which does not perform any chemical reaction, for instance, such as oxidation, even when it contacts active carbon at regeneration temperatures in the range of 300°-400° C. Said inert gas is obtained, for instance, from combustion of LPG. Carbonaceous adsorbent used in the present invention includes activated carbon, activated char and semi-coke. The term "heating gas" used herein means a gas capable of elevating the temperature of the active carbon up to the regeneration temperatures by indirect heat exchange with the active carbon.

BRIEF DESCRIPTION OF THE DRAWING

FIG. 1 and FIG. 2 are flow sheets showing embodiments of the present invention, respectively.

FIG. 2 is an embodiment wherein an additional inert gas is supplied in the vicinity of a rectifier within a separating zone and a cooler is disposed under said separating zone.

DESCRIPTION OF THE PREFERRED EMBODIMENTS

One embodiment of the present invention comprises mixing an inert gas with spent activated carbon which has been used for the dry desulfurization; allowing this mixture to flow down into a plurality of tubes disposed substantially perpendicularly within a heating zone; passing, on the other hand, a heating gas upwardly through said heating zone while indirectly heating the spent activated carbon within the tubes; purging matters adsorbed from the spent activated carbon by means of said inert gas; and separating the desorbed matters together with the inert gas from the activated carbon in a separating zone located under said heating zone.

The present invention will be described in more detail with reference to FIG. 1 and FIG. 2. The spent activated carbon which has been used for dry desulfurization is supplied from an upper valve $V_1$ to a regenerator 1. This regenerator, as clearly seen from the illustrated side sectional view, is composed of a storage zone 2, a mixing zone 3, a heating zone 4 and a separating zone 5. The spent activated carbon is stored in the storage zone 2. Subsequently, the spent activated carbon is supplied through drop tubes 6 to the mixing zone 3 and is mixed therein with a purging inert gas which is supplied to said zone sidewards through a line 7. The spent activated carbon and purging inert gas mixed together in the mixing zone are heated while falling down cocurrently within a plurality of heating tubes 8 disposed substantially perpendicularly in the heating zone 4.

In other words, since a heating gas is supplied through the line 9 to the outside of each heating tube 8 disposed in the heating zone 4, the spent activated carbon and inert gas present within the heating tubes 8 makes indirect heat exchange with this heating gas and is heated thereby to regeneration temperatures. And, the matters desorbed from the spent activated carbon by this heating, for instance, such as $SO_2$, etc., are purged from the activated carbon by the action of the inert gas and fall down to the separating zone 5 together with the regenerated activated carbon and inert gas. And, in this separating zone 5, the desorbed matters along with the inert gas are separated from the regenerated activated carbon and discharged from a gas outlet provided at the upper part of the separating zone to a line 10, while the regenerated activated carbon is taken out of the regenerator through a lower valve $V_2$. Herein, numeral 11 denotes a rectifier.

FIG. 2 illustrates an embodiment wherein an additional inert gas is supplied from a line 14 in the vicinity of the rectifier 11 provided within the separating zone and a cooler 15 is disposed under the separating zone 5 for cooling the regenerated active carbon. In this embodiment, the desorbed matters containing corrosive gases are purged substantially completely from the regenerated active carbon by the action of said additional inert gas and therefore there is no fear that corrosive gases reach close to the cooler maintained at condensing temperature range of 40° C.–150° C. Accordingly, this embodiment is advantageous in that the cooler 15 may be made of a normal low-quality material. The quantity of said additional inert gas preferably is in the range of 10–30% of the total quantity of inert gas.

Further, the heating gas discharged to the outside of the regenerator through the upper part of the heating zone after completion of indirect heat exchange with the spent activated carbon and inert gas within heating tubes, as shown in the drawing, is sent to a hot blast stove 13 through a recirculating fan 12 incorporated within lines 9, the heating gas is supplied here with the heat required and thereafter is recycled from lines 9 to the heating zone 5. And, though not shown in the drawing, buffers are inserted suitably outside of the tubes in the heating zone of said regenerator as seen in the conventional multitubular heat exchangers. Still further, although the aforesaid embodiment is so arranged that the spent activated carbon flows within heating tubes while the heating gas flows outside of said tubes, the regeneration of spent activated carbon can also be achieved according to the embodiment wherein the heating gas is arranged to flow within the heating tubes while the spent active carbon flows outside of said tubes.

According to the present invention, as described above, the spent carbonaceous adsorbent is heated gradually while flowing down within the heating zone and the matters absorbed thereon are desorbed therefrom. The said desorbed matters are purged by the action of the inert gas flowing cocurrently with said adsorbent, thereby moving toward the high temperature side. Therefore, in the case of the present invention there is no possibility that said desorbed matters will condense again. In addition, since the carbonaceous adsorbent and heating gas flow in countercurrent manner in the present invention there can be attained a superior heat efficiency. Still further, since there is no direct contacting possibility between the carbonaceous adsorbent and the heating gas, the present invention is advantageous in that the flow of carbonaceous adsorbent is not disturbed and a normal oxygen-containing hot gas can be employed so as to act as the heating gas. In addition thereto, the present invention, which is directed toward a process of heating spent carbonaceous adsorbent by means of indirect heat exchange, does not mingle the corrosive desorbed matters with the heating gas and does not require special attention to prevent the lines for recirculating the heating gas and associated equipment from being subject to corrosion.

What is claimed is:

1. A process for regenerating spent carbonaceous adsorbent particles which have been used to effect dry desulfurization of a sulfur oxide-containing exhaust gas so that said spent carbonaceous adsorbent particles contain adsorbed sulfur oxide material, which comprises the steps of: mixing said spent carbonaceous adsorbent particles with an inert purging gas to form a first mixture of said spent carbonaceous adsorbent particles and said inert purging gas; then feeding said first mixture downwardly through a heating zone and therein heating said first mixture by indirect heat exchange with a heating gas to a regeneration temperature effective to desorb said sulfur oxide material from said carbonaceous adsorbent particles whereby to regenerate said carbonaceous adsorbent particles and to transfer the desorbed sulfur oxide material into said inert purging gas to form a second mixture of said regenerated carbonaceous adsorbent particles, said desorbed sulfur oxide material and said inert purging gas; then feeding said second mixture downwardly into a separating zone and therein removing a third mixture of said desorbed sulfur oxide material and said inert purging gas from the upper portion of said separating zone and separately removing said regenerated carbonaceous adsorbent particles from the lower portion of said separating zone.

2. A process according to claim 1 wherein, in said heating zone, said first mixture is flowed downwardly through a plurality of substantially vertical heating tubes and said heating gas is flowed upwardly around the outer sides of said heating tubes.

3. A process according to claim 1 or claim 2 including the step of feeding an additional quantity of said inert purging gas into the lower portion of said separating zone.

4. A process according to claim 3 including the step of feeding said regenerated carbonaceous adsorbent particles removed from said separating zone through a cooling zone.

* * * * *